UNITED STATES PATENT OFFICE.

ROBERTO LEPETIT, OF MILAN, ITALY, ASSIGNOR TO THE FIRM OF LEPETIT, DOLLFUS & GANSSER, OF MILAN, ITALY.

ETHOXYPHENYLAMIDOMETHANE SULFONATE.

934,554.

Specification of Letters Patent. Patented Sept. 21, 1909.

No Drawing. Application filed June 27, 1908. Serial No. 440,696. (Specimens.)

*To all whom it may concern:*

Be it known that I, ROBERTO LEPETIT, a subject of the King of Italy, residing at No. 2 Via Ippilito Rosellino, Milan, in the Kingdom of Italy, have invented new and useful Improvements in Ethoxyphenylamidomethane Sulfonates and Processes for Manufacturing the Same, of which the following is a specification.

Among the crystallized compounds which are obtained by allowing aromatic amido compounds to react on bisulfites and formaldehyde as I have described in a sealed letter in the year 1900, published in the November 1905 number of the *Bulletin de la Société Industrielle de Mulhouse*, pages 379 to 384, I have now found that a compound belonging to this series and not having yet been described or prepared resulting from the reaction of para-phenetidin on formaldehyde and bisulfite of soda, has valuable pharmaceutical properties. This new compound is obtained by the mutual action of paraphenetidin, formaldehyde and bisulfites on each other. The compound may be prepared either by the action of paraphenetidin on formaldehyde and adding bisulfite of soda subsequently, or by adding formaldehyde to a mixture of paraphenetidin with bisulfite, or by adding to paraphenetidin a mixture of bisulfite and formaldehyde and heating. The reaction which takes place may be represented by the following equation:

$$C_2H_5.O.C_6H_4.NH_2 + NaHSO_3 + CH_2O =$$
Paraphenetidin.    Bisulfite of    Formal-
                                 sodium.      dehyde.

$$H_2O + C_2H_5O.C_6H_4.NH.CH_2SO_3Na.$$
Water.    Ethoxyphenylamidomethane sulfonate of sodium.

I have found after many experiments that the following is the best method for quickly obtaining the new product and in as pure and white form as possible. I dissolve 1000 grams of paraphenetidin in 3000 cc. alcohol and add with accompanying stirring 511 cc. (one molecular proportion) of a 40% formaldehyde solution, then immediately add 1420 cc. of bisulfite of soda (spec. gr. 1.357). I then heat the mixture with the addition of 1000 cc. hot water to the boiling point until all crystals are dissolved. I filter quickly the hot solution and allow it to crystallize. After 24 hours or more I filter the crystals by means of a vacuum and wash them with alcohol. The product so obtained is a mass of white crystals which after drying contain 1 molecule of water of crystallization; the analysis shows a content of 6.67% water instead of the theoretical amount of 6.64% for a compound of the formula $$C_2H_5O.C_6H_4.NH.CH_2.SO_3Na + H_2O.$$

This formula is fixed from the result of the estimation of the amounts of carbon, hydrogen, nitrogen and sulfur, obtained by a complete analysis of the new compound, which is consequently a paraethoxyphenylamidomethane sulfonate of sodium.

The new compound is colorless, inodorous and has a saline taste which after a certain length of time is replaced by a pure sweet taste which lasts a long time. It is easily soluble in water; an addition of acid to the aqueous solution causes the precipitation of the less soluble ethoxyphenylamidomethane sulfonic acid. If some drops of a solution of ferric chlorid are added to a solution containing about one half of one per cent. of an ethoxyphenylamidomethane sulfonate, a bright purple color is yielded; chromic acid and chlorid of gold give the same reaction. By adding some bichromate of potash to a cold diluted solution containing hydrochlorid of paramidophenol, hydrochloric acid and a very small amount of ethoxyphenylamidomethane sulfonate of soda, a bright blue color appears. The same characteristic reactions are shown by any other soluble salts of the ethoxyphenylamidomethane sulfonic acid as they may be obtained either by double decomposition with the sodium salt or by using in the manufacture of the new compound other soluble bisulfites in the required proportion instead of bisulfite of soda.

Careful pharmacological experiments have shown that the new compound has very valuable properties and affects the heart less than other similar compounds heretofore known.

What I claim as my invention, and desire to secure by Letters Patent, is:—

1. As a new article of manufacture, the herein-described ethoxyphenylamidomethane sulfonate of sodium, corresponding to the formula $$C_2H_5O.C_6H_4.NH.CH_2.SO_3Na + 1H_2O$$

being colorless, inodorous, easily soluble in water, and giving in aqueous solution on addition of acids the precipitation of ethoxyphenylamidomethane sulfonic acid.

2. The process of preparing ethoxyphenylamidomethane sulfonate of the alkalies, which consists in mixing together one molecular proportion of paraphenetidin in solution, one molecular proportion of formaldehyde, and one molecular proportion of a bisulfite of an alkali metal, heating the mixture and allowing it to cool.

3. The process of preparing ethoxyphenylamidomethane sulfonate of sodium, which consists in dissolving one molecular proportion of paraphenetidin in alcohol, adding one molecular proportion of formaldehyde in aqueous solution and then adding one molecular proportion of bisulfite of sodium, heating the mixture to the boiling point and allowing it to cool.

In testimony whereof I affix my signature in presence of two witnesses.

ROBERTO LEPETIT.

Witnesses:
  MICHAEL SIERSDORFER, Jr.,
  E. LEPETIT.